US012144347B2

(12) United States Patent
Erro Garces et al.

(10) Patent No.: US 12,144,347 B2
(45) Date of Patent: Nov. 19, 2024

(54) FERTILIZING AND BIO STIMULATING PRODUCT CONTAINING FRUCTOOLIGOSACCHARIDES, APPLICATION METHOD AND USES

(71) Applicant: AGRO INNOVATION INTERNATIONAL, Saint-Malo (FR)

(72) Inventors: Javier Erro Garces, Pamplona (ES); Oscar Urrutia Sagardia, Pamplona (ES); Maria Garnica Ochoa, Allo (ES); Diane Lemenager, Saint Malo (FR); Esther Casanova Portillo, Pamplona (ES); Jose Maria Garcia-Mina Freire, Iza (ES); Jean-Claude Yvin, Saint Malo (FR)

(73) Assignee: AGRO INNOVATION INTERNATIONAL, Saint-Malo (FR)

( * ) Notice: Subject to any disclaimer, the term of this patent is extended or adjusted under 35 U.S.C. 154(b) by 0 days.

(21) Appl. No.: 16/280,812

(22) Filed: Feb. 20, 2019

(65) Prior Publication Data
US 2019/0183120 A1    Jun. 20, 2019

Related U.S. Application Data

(62) Division of application No. 15/302,410, filed as application No. PCT/FR2015/050917 on Apr. 8, 2015, now abandoned.

(51) Int. Cl.
| | |
|---|---|
| A01N 43/40 | (2006.01) |
| A01H 3/04 | (2006.01) |
| A01N 43/16 | (2006.01) |
| C05B 17/00 | (2006.01) |
| C05B 17/02 | (2006.01) |
| C05G 1/00 | (2006.01) |
| C05G 3/00 | (2020.01) |

(52) U.S. Cl.
CPC .............. A01N 43/16 (2013.01); C05B 17/00 (2013.01); C05B 17/02 (2013.01); C05G 3/00 (2013.01)

(58) Field of Classification Search
CPC ........ A01N 43/16; C05B 17/00; C05B 17/02; C05G 3/00
See application file for complete search history.

(56) References Cited

U.S. PATENT DOCUMENTS

| | | | | | |
|---|---|---|---|---|---|
| 5,710,040 | A | ‡ | 1/1998 | Christner | ................. C14C 1/00 435/188 |
| 5,733,579 | A | ‡ | 3/1998 | Wolf | ................. A61K 31/7016 424/60 |
| 6,387,847 | B1 | * | 5/2002 | Yvin | ................. A01N 43/16 504/117 |
| 6,979,665 | B2 | * | 12/2005 | Yvin | ................. A01N 43/16 504/117 |
| 2003/0068429 | A1 | * | 4/2003 | Frippiat | ................. A61P 19/08 426/658 |
| 2007/0232494 | A1 | * | 10/2007 | Briand | ................. A01N 43/16 504/189 |
| 2010/0008860 | A1 | ‡ | 1/2010 | Kowalczyk | ...... A61K 47/48092 424/9.6 |
| 2010/0186471 | A1 | ‡ | 7/2010 | Vriesema | ................. C05B 7/00 71/28 |
| 2011/0081449 | A1 | * | 4/2011 | Leenheer | ................. C07H 3/06 426/48 |
| 2011/0294864 | A1 | * | 12/2011 | Remon | ................. A61P 33/00 514/420 |
| 2012/0264193 | A1 | ‡ | 10/2012 | Kuwana | ................. C12N 1/20 435/252.1 |
| 2015/0232989 | A1 | ‡ | 8/2015 | Lee | ................. C23C 16/458 427/255.28 |

FOREIGN PATENT DOCUMENTS

| | | | | |
|---|---|---|---|---|
| CN | 101006777 | ‡ | 1/2007 | |
| CN | 100486434 | C * | 5/2009 | |
| CN | 102671206 | A * | 9/2012 | |
| JP | 1998298020 | | * 10/1998 | |
| JP | H10-298020 | A | * 11/1998 | |
| JP | 10338585 | A | * 12/1998 | .............. C05F 11/00 |
| JP | 2007215462 | A | * 8/2007 | |
| WO | WO-98/46081 | ‡ | 10/1998 | |
| WO | WO-2008046428 | A1 ‡ | 4/2008 | |

OTHER PUBLICATIONS

Haraguchi et al., Carbohydrate Polymers 66 (2006) pp. 75-80 (Year: 2006).*
Jaulneau, et al., Journal of Biomedicine and Biotechnology, 2010, Article ID 525291, 11 pp. (Year: 2010).*
Fu et al. Carbohydrate Polymers 86 (2011) 774- 782 (Year: 2011).*
Wang et al. Postharvest Biology and Technology 52 (2009) 110-116 (Year: 2009).*
Akiyama et al. "Changes in sugar level and related enzyme activity of arbuscular mycorrhizal asparagus." X International Asparagus Symposium 589. 2001 (Year: 2001).*
Suzuki et al. J. Japan. Soc. Hort. Sci. 73 (2): 119-127. 2004 (Year: 2004).*
Silva et al. Food Chemistry 138 (2013 ) 148-153 (Year: 2013).*
Wang et al. Physiological and Molecular Plant Pathology 74 (2009) 34-40 (Year: 2009).*
Klarzynski et al. Molecular Plant-Microbe Interactions 16.2, 2003 (Year: 2003).*
Fouldrin, K., and A. Limami. "The influence of nitrogen (15NO3) supply to chicory (*Cichorium intybus* L.) plants during forcing on the uptake and remobilization of N reserves for chicon growth." Journal of experimental botany 44.8 (1993): 1313-1319. (Year: 1993).*

(Continued)

*Primary Examiner* — Mina Haghighatian
*Assistant Examiner* — Janice Y Silverman
(74) *Attorney, Agent, or Firm* — HSML P.C.

(57) ABSTRACT

The present invention relates to the use of a fructooligosaccharide (FOS) comprising from 2 to 10 monosaccharide units, as an elicitor of the mechanisms of absorption of mineral elements from the soil, and of the defense mechanisms against pathogens. It also relates to a fertilizing and biostimulating composition containing these fructooligosaccharides, and to the use thereof in a method for treating crop plants.

7 Claims, 2 Drawing Sheets

(56) References Cited

OTHER PUBLICATIONS

"What is Profeed?"; Profeed FOS fructo-oligosaccharides scFOS prebiotic feed, 2018, retrived from the web, http://profeed.beghin-meiji.com/?ID=60, pp. 1-3.‡
Park, Jong Pil et al., "Critical effect of ammonium ions on the enzymatic reaction of a novel transfructosylating enzyme for fructooligosaccharide production from sucrose," Biotechnology Letters. Nov. 1, 1999, vol. 21. [online], [retrieved on Oct. 9, 2014]. Retrieved from the internet <http://search.proquest.com/docview/735164731> pp. 987-990.‡
Zhang, Peng, Ying et al., "A Novel Burdock Fructooligosaccharide Induces Changes in the Production of Salicylates, Activates Defence Enzymes and Induces Systemic Acquired Resistance to Colletotrichum orbiculare in Cucumber Seedlings," Journal of Phytopathology. Apr. 1, 2009, vol. 157, No. 4, pp. 201-207.‡
International Search Report issued in PCT/FR2015/050917, mailed Jun. 26, 2015, 7 pages. English translation.‡
Korzeniowska et al., Polish Journal of Chemical Technology, vol. 15, No. 4, pp. 10-14. (Year: 2013).‡
Yi et al., Food Bioprocess Technol. (2012), vol. 3, pp. 315-319.‡
Meiji, Beghin, "Profeed" Jul. 5, 2007, France [online], [retrieved on Oct. 9, 2014]. Retrieved from the internet <URL:http://www.beghin-meiji.com/feed/fiche_prod.php?ID=60> 1 page.
"What is Profeed?"; Profeed FOS fructo-oligosaccharides scFOS prebiotic feed, 2018, retrieved from the web, http://profeed.beghin-meiji.com/?ID=60, pp. 1-3.

\* cited by examiner
‡ imported from a related application

FERTILIZING AND BIO STIMULATING PRODUCT CONTAINING FRUCTOOLIGOSACCHARIDES, APPLICATION METHOD AND USES

The present invention relates to the use of fructooligosaccharides to elicit mechanisms for absorption of inorganic nutrients and as agents for stimulating plant defenses against pathogens.

The invention also relates to fertilizing and biostimulating products containing such fructooligosaccharides, and also to a method for spreading these fructooligosaccharides on crops.

The necessity to increase the effectiveness of agricultural practices is subject to both economic and environmental constraints.

One of the strategies for increasing yields consists in producing more effective fertilizers, for example by reducing the loss of nutritive elements into the soil. Thus, urease and nitrification inhibitors have been used with the purpose of reducing the volatilization of ammonia and the leaching of nitrates.

Another supplementary strategy consists in developing molecules which increase the plant's capacity to absorb nutrients from the soil, or in stimulating the plant's natural defenses against pathogens. Recently, a fructooligosaccharide comprising thirteen fructose units has been described as a growth activator for plants at different stages of development (CN 2007/101006777 et *J. Phytopathol.*, 157, pp 201-207, 2009). This effect is attributed to the activation of the production of salicylic acid and the glycosylated homolog thereof in the leaves of treated plants. The fructooligosaccharide is obtained by aqueous-phase extraction from burdock (*Arctium lappa*) roots followed by enzymatic deprotonation, precipitation in ethanol and purification by chromatography.

The invention relates to fructooligosaccharides of lower molecular weight than that of the fructooligosaccharide described in the prior art. Indeed, the inventors have discovered that these fructooligosaccharides cause a better rate of nutrient absorption by the roots of the plants, and further stimulate the plant's natural defenses. This effect relates to all inorganic nutrients, in particular nitrogen, phosphorus and calcium. Indeed, the fructooligosaccharides used within the context of the invention have better water-solubility than the fructooligosaccharides of the prior art. The inventors have found that inulin cannot be applied in the form of a fertilizer in aqueous solution, since this compound cannot remain stable in the stock solution before application thereof to the crops.

The product of the invention enables increased production of organic nitrogen in the plant, responding to the growth requirements of the crop, which is manifested in an increased yield. The product of the invention also enables an increase in the protein content and the nutritional value of protein-producers and fodder. The product of the invention also makes it possible to reduce the risks of toxicity caused by an excessive accumulation of ammonium ions in the leaves or to reduce the accumulation of nitrates in the leaves.

Thus, a subject of the present invention is a fertilizing and/or biostimulating composition containing fructooligosaccharides and also a process for treating plants or soils using them.

Within the context of the present description, the expression "fertilizing composition" is Intended to mean any product, the use of which is intended to ensure, or improve, plant nutrition.

"Fructooligosaccharide" is intended to mean a compound comprising several fructose units and optionally another monosaccharide unit.

Within the context of the present description, the expression "biostimulating composition" is intended to mean any product, the use of which is intended to ensure the ability of the plants to stimulate their leaf or root metabolism.

According to a first aspect, a subject of the invention is a fertilizing and/or biostimulating composition containing at least one fructooligosaccharide (FOS) comprising from 2 to 10 monosaccharide units, which fructooligosaccharide is optionally sulfated. The composition may contain the fructooligosaccharide in combination with one or more fertilizing materials. The fructooligosaccharide is preferably in an effective amount in the composition in order to cause the desired effect.

The amount of FOS supplied to the plants must be sufficient to stimulate the eliciting of mechanisms for absorbing inorganic nutrients. This amount is variable depending on the nature of the plant to be treated and the mode of treatment (via the leaves or via the roots). This amount may especially be determined on a case by case basis by employing macroarray tests as defined below.

The fructooligosaccharides used within the context of the present invention are polymers comprising at least one fructose unit and at least one $C_3$-$C_6$ monosaccharide unit, preferably a $C_6$ monosaccharide unit other than fructose, for example chosen from glucose, mannose and xylose.

The fructooligosaccharide (FOS) used within the context of the present invention comprises from 2 to 10 monosaccharide units (2 and 10 being included), said monosaccharide units comprising at least one fructose. It is preferred that the fructooligosaccharide (FOS) used within the context of the present invention comprise from 2 to 9 monosaccharide units (2 and 9 being Included), or from 2 to 8 monosaccharide units (2 and 8 being included), or else from 2 to 7 monosaccharide units (2 and 7 being included), or else from 2 to 6 monosaccharide units (2 and 6 being included), for example from 2 to 6 monosaccharide units (2 and 6 being included), from 2 to 5 monosaccharide units (2 and 5 being included), from 2 to 4 monosaccharide units (2 and 4 being included). The fructooligosaccharide (FOS) used within the context of the present invention may be a mixture of the above fructooligosaccharides.

The fructooligosaccharide (FOS) used within the context of the present invention advantageously corresponds:
to the formula Glucose-(Fructose)$_n$ or Mannose-(Fructose)$_n$, also denoted $GF_n$, in which n ranges from 1 to 9, preferably from 1 to 8, and preferably still from 1 to 3, or
to the formula (Fructose)$_m$, also denoted $F_m$, in which m ranges from 2 to 10.

Compounds of formula $GF_n$ such that n=1, 2 or 3 are preferred. The fructooligosaccharide (FOS) used within the context of the present invention may be a mixture of Glucose-(Fructose)$_n$ or Mannose-(Fructose)$_n$ compounds such that n ranges from 1 to 3 (1 and 3 being Included).

The fructooligosaccharides may be chosen from the group consisting of the compounds nystose ($GF_3$), kestose ($GF_2$), fructosylnystose ($GF_4$), bifurcose ($GF_3$), such that G=glucose, inulobiose ($F_2$), inulotriose ($F_3$) and inulotetraose ($F_4$).

The FOSs may be obtained from the abovementioned species by a method comprising the steps of washing, grinding, extraction (solid-liquid separation) and optionally fractionation and concentration.

The FOSs may also be obtained by acid or enzymatic hydrolysis, from the abovementioned extracts.

According to one embodiment of the invention, the fructooligosaccharides are obtained by hydrolysis of inulin or by hydrolysis of oligosaccharides obtained from inulin. The hydrolysis may be carried out enzymatically, chemically or microbially (for example by Bifidobacterium).

According to one particular embodiment of the invention, the fructooligosaccharides are obtained by enzymatic hydrolysis of inulin.

Inulin is a polysaccharide consisting of D-fructose units bonded by β(2,1) linkages and of a D-glucose end group bonded by an α(1,2) linkage. The degree of polymerization of inulin is generally of the order of 40 to 60 monosaccharide units.

Inulin may be extracted from the roots of various plants, in particular Jerusalem artichoke and chicory.

The plant extract containing FOSs obtained according to one of the methods described above may be more or less concentrated depending on the intended use. Total dehydration of the extract enables it to be made available in water-soluble pulverulent form. The dehydration may be obtained by drum drying or spray drying.

Alternatively, the fructooligosaccharides may be obtained by chemical synthesis.

According to one variant, the fructooligosaccharides may be obtained by transfructosylation of sucrose, for example by the transfructosylation action of an *Aspergillus niger* ß-fructosidase on sucrose.

The fructooligosaccharides may be sulfated, for example by reaction of an FOS as described above with sulfuric acid in the presence of pyridine.

The FOSs described above may be used alone or in a mixture with Inorganic fertilizers, to prepare the fertilizing and/or biostimulating product of the invention.

It is known that fertilizers are defined as fertilizing materials, the main function of which is to supply plants with elements directly useful to their nutrition (major fertilizing elements, secondary fertilizing elements and trace elements).

To this end, root or leaf fertilizers generally use sources of nitrogen, phosphorus and potassium as well as trace elements and amino adds.

Plants mainly absorb nitrogen, which is an essential nutritive element for their growth. The nitrogen is generally supplied in the form of nitrate or ammonium, the use of which in large amounts poses problems from an ecological viewpoint.

The fertilizing and/or biostimulating product of the invention containing FOSs may therefore be used as a supplement in conventional fertilizing compositions such as fertilizers in order to activate inorganic nitrogen absorption and the assimilation thereof in the form of proteins.

The fertilizing and/or biostimulating product of the invention may therefore contain one or more fertilizing materials chosen from urea, ammonium sulfate, ammonium nitrate, natural phosphate, potassium chloride, ammonium sulfate, magnesium nitrate, manganese nitrate, zinc nitrate, copper nitrate, phosphoric acid and boric acid.

The product of the invention may contain biostimulating agents chosen from humic adds, extracts of marine algae, amino adds, plant hormones or a mixture thereof.

The fructooligosaccharide (FOS) represents for example from 0.1 to 10% by weight, for example 1% by weight, of the weight of the composition.

When it is formulated in liquid form, the product of the invention contains for example from 0.1 to 5% by weight of FOS. When it is formulated in solid form, the product of the invention contains for example from 1 to 10% by weight of FOS.

The product of the invention may be in the form of a product chosen from calcareous enriching agents, organic enriching agents and crop supports, root fertilizers of NP, PK, NPK type, leaf fertilizers or else nutritive solutions for roots.

Another subject of the invention is a method for fertilizing plants to improve their absorption of inorganic nutrients, which comprises the application, to said plants or to the soils, of an effective amount of a fructooligosaccharide (FOS) comprising from 2 to 10 monosaccharide units or of a composition as has just been described.

Another subject of the invention is a method for the biostimulation of plants which comprises the application, to said plants or to the soils, of an effective amount of a fructooligosaccharide (FOS) comprising from 2 to 10 monosaccharide units or of a product as described above.

According to another aspect, the present application aims to protect a method for treating plants or soils intended to activate reactions for eliciting mechanisms for absorption of inorganic nutrients, characterized in that it comprises the application, to said plants or to said soils, of an effective amount of FOS.

In one of these three methods, the product of the invention or the FOS may be applied to the plants via the leaves or via the roots.

Generally, the amount of FOS supplied to the plants is from 0.1 g to 100 g per litre, and preferentially of the order of 1 g per litre, when supplied in liquid form via the leaves or in nutritive solutions for the roots (hydroponically or dropwise).

The amount of FOS supplied to the plants is for example from 10 to 1000 g/ha, preferably of the order of 200 g/ha, when supplied in solid form, for example in pulverulent or granulated fertilizers.

The product of the invention may be used in one of the methods forming the subjects of the invention, at the following recommended doses:

Application to leaves: between 0.5 and 5 kg/ha at a degree of dilution of between 0.1-0.5%, Application to the roots—application on the ground: 10-50 kg/ha, Application to the roots—fertigation: 10-20 kg/ha by dropwise irrigation at a degree of dilution of between 0.1-0.5%.

The present invention can be used in the treatment of a very wide variety of plants. Among the latter, mention will in particular be made of:

large-scale crop plants such as cereals (wheat, corn),
protein-yielding plants (pea),
oil-yielding plants (soybean, sunflower),
grassland plants of use for animal feed,
specialized crops such as, in particular, crops for market gardening (lettuce, spinach, tomato, melon), grapevine, tree cultivation (pear, apple, nectarine), or horticulture (rose bushes).

The expression "plant" is intended to denote, in the present application, the plant considered as a whole, including its root system, its vegetative system, the grains, seeds and fruits.

According to yet another aspect, the present application aims to cover the use of FOSs comprising from 2 to 10 monosaccharide units to elicit mechanisms for absorption of inorganic nutrients in plants and as agent for stimulating natural plant defenses. The inorganic nutrients will in particular be nitrogen, phosphorus and calcium.

The present invention will now be illustrated by the following figures and nonlimiting examples. In these examples, unless otherwise indicated, the percentages are expressed by weight and the temperature is room temperature.

Figure 1:
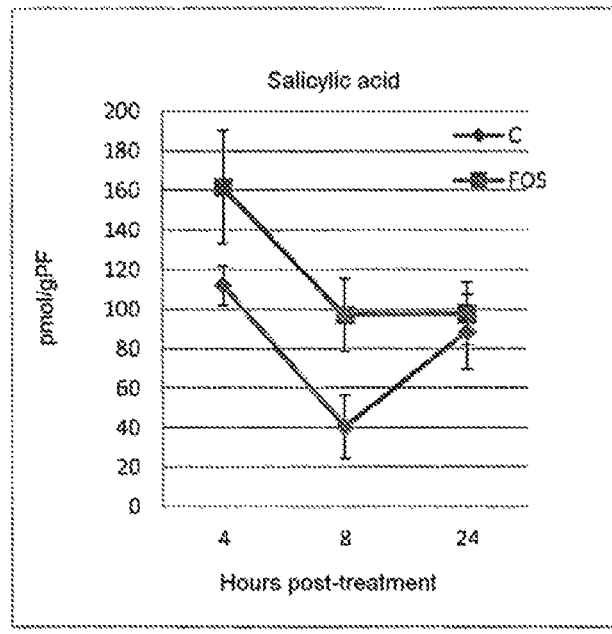
FIG. 1 represents the concentration of salicylic acid (expressed as pmol/gPF) in the stems of young tobacco plants supplied with a nutritive solution containing a fructooligosaccharide in accordance with the invention (FOS) or the same nutritive solution without FOS (C).

EXAMPLE 1: SOLID GRANULATED NPK FERTILIZER CONTAINING A FRUCTOOLIGOSACCHARIDE 10 kg of a fructooligosaccharide sold under the trade name PROFEED® L95 were mixed with 250 kg of ammonium sulfate, 50 kg of urea, 300 kg of superphosphate and 300 kg of potassium chloride in a drum pelletizer in the presence of 125 l of water at 45° C. All the starting materials, including the fructooligosaccharides, were ground beforehand.

The granules were dried in a drum dryer at 90° C. for 15 min.

EXAMPLE 2: LIQUID WATER-SOLUBLE NPK FERTILIZER CONTAINING A FRUCTOOLIGOSACCHARIDE 100 l of water were mixed with 10 kg of a fructooligosaccharide manufactured and sold under the trade name PROFEED® L95. The mixture was kept under continuous agitation for 2-6 hours. The temperature was preferably between 25-70° C.

The liquid containing the fructooligosaccharide was mixed with 10 kg of urea and 25 kg of monopotassium phosphate. The mixture was kept under continuous agitation at 25° C. for 24 h and the final product was filtered.

EXAMPLE 3: EFFECT OF A FRUCTOOLIGOSACCHARIDE ON THE RATE OF ABSORPTION OF NUTRITIVE ELEMENTS BY YOUNG LETTUCE PLANTS

Methodology:

The tests were carried out on young, 15-day-old lettuce (*Lactuca sativa*) plants cultivated hydroponically. The tests were carried out in a greenhouse at temperatures of 22° C./16° C. day/night, 60% humidity and a photoperiod of 10 hours.

The lettuce seedlings (originating from a nursery) were washed to remove the compost around the root, and grown hydroponically for two days in water in order to remove the nutritive elements originating from the precultivation.

The rate of absorption of the minerals depending on whether the nutritive solution contained FOS (treatment) or not (control) was compared.

9 young lettuce plants (three batches each comprising three young plants) were transferred to a fresh nutritive solution containing 100 mg·l$^{-1}$ of a fructooligosaccharide sold by Beghin Meiji under the reference PROFEED® L95.

9 young lettuce plants (three batches each comprising three young plants) were transferred to the same fresh nutritive solution not containing FOS (control).

The nutritive solution contained: 2 mM of $NO_3^-$, 2 mM of $PO_4^{2-}$, 4 mM of $K^+$, 1 mM of $Ca^{2+}$, 2 mM of $Mg^{2+}$, 100 μM of Fe, 14 μM of B, 16 μM of Mn, 4 μM of Mo and 0.8 μM of Cu. The pH of the solution was adjusted to 6 with KOH.

The amount of the inorganic elements absorbed was calculated by monitoring the depletion of these elements in the nutritive solution over a period of 30 hours. The nitrate measurements were carried out by ion chromatography (Dionex 120) and the measurements of the other elements (P, Ca, Mg, K, Fe) were carried out by optical ICP (IRIS Intrepid II xdl, Thermo-Electron).

The plants were then harvested. The root and the aerial part were separated, weighed then dried in a forced air oven at 45° C. for 48 h in order to determine their dry weight.

Results:

The results underwent statistical analysis (ANOVA) using the STATISTICA 6.0 program, taking $P<0.05$ as significant.

The degrees of root absorption of the nitrate, phosphate and calcium by the lettuces have been given in the following table. The results are expressed as % relative to the control (100%).

|  | Nitrate | Phosphate | Calcium |
| --- | --- | --- | --- |
| Control without FOS | 100 | 100 | 100 |
| Treatment with FOS | 112.95 | 159.8 | 119 |

EXAMPLE 4: COMPARISON OF THE EFFECT OF A FRUCTOOLIGOSACCHARIDE ACCORDING TO THE INVENTION WITH A FRUCTOOLIGOSACCHARIDE NOT IN ACCORDANCE WITH THE INVENTION

The impact of a fructooligosaccharide in accordance with the invention and the impact of a fructooligosaccharide not in accordance with the invention on biostimulation were compared by measuring the content of jasmonic acid (plant hormone) in the stems of young tobacco plants.

This is because the metabolic pathway of jasmonic acid (JA) plays a role in resistance to insects and diseases. An increase in the content of jasmonic acid in the tissues is therefore a good indicator of the increase in the potential of the young plants to resist pathogenic agents.

The effect of a fructooligosaccharide (FOS) comprising from 2 to 10 monosaccharide units (sold under the reference PROFEED® L95) was compared to the effect of a comparative FOS (sold under the reference PROBIOFEED®, containing 95% inulin and 5% monosaccharides). PROFEED® L95 comprises several FOS molecules, including GF2, GF3, and GF4.

Growth of the Plants

Young tobacco plants germinated in a mixture of peat/sand (1/1 proportion) were transplanted at the 5-leaf stage into a 1 l pot in a greenhouse. The plants were treated by radicular application of a 0.3% aqueous FOS solution, a 0.3% aqueous chicory inulin (Sigma I2255) solution, or the same aqueous solution not containing FOS or inulin. The experiment was carried out on five plants for each treatment applied.

Other oligosaccharides such as betamune (B), bio-mannanoligosaccharides (MS), mannanoligosaccharide (M), were tested either in aqueous solution (10 min at 100° C.) (B20, MS20, M20) or in acid solution (0.1N HCl, 10 min at 100° C., the pH of which was neutralized before application to the plants) (BCl, MSCl, MCl).

Analyses

The plants harvested following application of the treatment were frozen and ground with liquid nitrogen in order to carry out the quantitative analysis of the jasmonic acid and salicylic acid that they contain, according to the following protocol.

Reagents and Materials

The jasmonic acid (JAS) and salicylic acid (SAL) standards were provided by Sigma-Aldrich (St Louis, USA). The dihydrojasmonic acid (DHJAS) used as internal standard for the jasmonic acid was provided by OlChemin Ltd (Olomouc, Czech Republic), and the $^2H_4$-salicylic acid (D-SAL) used as internal standard for the salicylic add was provided by Sigma-Aldrich (St Louis, USA).

Agitations were carried out in a Multi Reax system from Heidolph Instruments (Schwabach, Germany) and centrifugations in a Centrikon T-124 centrifuge from Kontron Instruments (Zurich, Switzerland). Evaporations were carried out in a model 432-2100 vortex evaporator from Labconco Corporation (Kansas City, MO, USA).

Extraction Method 0.25 gram of plant tissue (fresh weight) are weighed out, to which are added 100 µl of a solution of D-SAL and DHJAS (1000 ng/ml in methanol) and 2 ml of MeOH/H$_2$O/HCOOH (90/9/1 by volume) containing 2.5 mM of sodium diethyldithiocarbamate at −20° C. Everything is agitated for 60 minutes at maximum speed, 2000 min$^{-1}$, and centrifugation is carried out at 11 000 min$^{-1}$ for 10 minutes at 20° C. 0.5 ml of supernatant is introduced into a test tube already containing 0.5 ml of 0.4% acetic acid, then this is agitated and centrifuged at 12 000 min$^{-1}$ for 10 minutes. A portion of the supernatant is poured into a chromatography vial, from which it is injected into the LC/MS/MS system.

Chromatographic Method

A Waters AllianceHT (Milford, MA, USA) chromatograph is used, fitted with a 2795 XE separation module, an ALLCOLHTR column module with temperature regulation, and a 4 µm Hydro-RP Synergi (15×0.2 cm) chromatographic column (Phenomenex, Torrance, CA, USA). The gradient and the conditions used are as follows:

| Minutes | ml/min | % MeOH | % 0.4% acetic acid |
|---------|--------|--------|--------------------|
| 0 | 0.2 | 35 | 65 |
| 1 | 0.2 | 35 | 65 |
| 6 | 0.2 | 60 | 40 |
| 14 | 0.2 | 64 | 36 |
| 15 | 0.2 | 90 | 10 |
| 16 | 0.2 | 90 | 10 |
| 17 | 0.2 | 35 | 65 |
| 20 | 0.2 | 35 | 65 |

Injection volume: 40 µl.
Sample temperature: 20° C.
Column temperature: 30° C.

Mass Spectrometry Method

A 3200 Q TRAP LC/MS/MS System mass spectrometry detector (Applied Biosystems/MDS Sciex, Ontario, Canada) is used, fitted with a Turbo Ion Spray interface operating in negative mode.
Source Parameters:
  CUR (curtain gas flow rate): 22.00 psi.
  IS (ion spray voltage): −4000 V.
  TEM: 550° C.
  GS1 (nebulizer gas flow rate): 45.00 psi.
  GS2 (reheater gas flow rate): 55.00 psi.
Mass Analyzer Parameters:
  Scan mode: MRM (multiple reaction monitoring).
  Q1 resolution: low.
  Q3 resolution: 1.
  CAD (collision-activated dissociation) gas: medium.
  CXP (collision cell exit potential): −4.00 V.
Detector Parameters:
  CEM (multichannel electron multiplier): −2800.0 V.
The data obtained are processed by means of the Analyst 1.4.2 software from Applied Blosystems.

Results

The results are given in the table below.

| Compound | Transition | | Ionization and collision parameters | | | | |
|----------|-----------|------|------------|--------|-------|---------|--------|
|          | Q1 (amu)  | Q3 (amu) | Dwell (ms) | DP (V) | EP (V) | CEP (V) | CE (V) |
| JAS   | 209 | 59  | 40 | −35 | −7 | −12 | −22 |
|       | 209 | 165 | 40 | −35 | −7 | −12 | −20 |
| DHJAS | 211 | 59  | 40 | −34 | −8 | −13 | −21 |
|       | 211 | 167 | 40 | −34 | −8 | −13 | −20 |
| SAL   | 137 | 93  | 40 | −25 | −6 | −10 | −20 |
|       | 137 | 65  | 40 | −25 | −6 | −10 | −38 |

-continued

| Compound | Transition | | | Ionization and collision parameters | | | |
|---|---|---|---|---|---|---|---|
| | Q1 (amu) | Q3 (amu) | Dwell (ms) | DP (V) | EP (V) | CEP (V) | CE (V) |
| D-SAL | 141 | 97 | 40 | −30 | −5.5 | −10 | −20 |
| | 141 | 69 | 40 | −30 | −5.5 | −10 | −36 | amu = atomic mass unit
Jasmonic acid (JAS)
Salicylic acid (SAL)
Dihydrojasmonic acid (DHJAS)
$^2H_4$-Salicylic acid (D-SAL)

The total yield, including the matrix effect, was calculated in two ways. Firstly, plants were doped with different concentrations of hormones and the subtraction with the non-doped plant was compared to standards inserted between the samples as controls. As indicated in the tables, the doping was carried out with different concentrations depending on the hormone in question, taking into account the differences in sensitivity between them and also the concentration differences observed in the plant used, cucumber. The yield was also calculated by means of the internal standard, as the quotient between the mean of the areas of each internal standard in the samples to be examined and in the standards Inserted between the samples as controls. The results are as follows.

Total Yield in the Leaves

| Hormone | +2.5 | +5 | +10 | +25 | +50 | +100 | Int. std. |
|---|---|---|---|---|---|---|---|
| JAS | 73.1 | 102.1 | 99.7 | 98.5 | 99.3 | 98.8 | 92.7 |
| SAL | 73.2 | 103.8 | 98.2 | 97.5 | 99.0 | 101.2 | 94.3 |

Total Yield in the Roots

| Hormone | +2.5 | +5 | +10 | +25 | +50 | +100 | Int. std. |
|---|---|---|---|---|---|---|---|
| JAS | 93.7 | 92.5 | 92.4 | 92.4 | 91.8 | 93.6 | 97.5 |
| SAL | 89.0 | 95.0 | 95.2 | 98.5 | 94.5 | 95.2 | 98.1 |

The values for limit of detection (LOD) and limit of quantification (LOQ) were calculated by taking 10 times the mean level of background noise in the blanks, and likewise in the plant samples. The background noise was measured in the zones of the chromatogram close to the retention time of the hormones. In the case of the standards, the results are expressed in ng/ml and in picograms injected and, in the case of the plant extracts, in ng/g of plant. The results are as follows:

Limit of Detection (LD) and Limit of Quantification (LOQ)

| Hormone | LOD standards ng/ml (pg) | LOD plant ng/g | LOQ standards ng/ml (pg) | LOQ plant ng/g |
|---|---|---|---|---|
| JAS | 0.15 (6) | 1.20 | 0.45 (18) | 3.50 |
| SAL | 0.10 (4) | 1.00 | 0.30 (12) | 3.00 |

CONCLUSION

Figure 2:
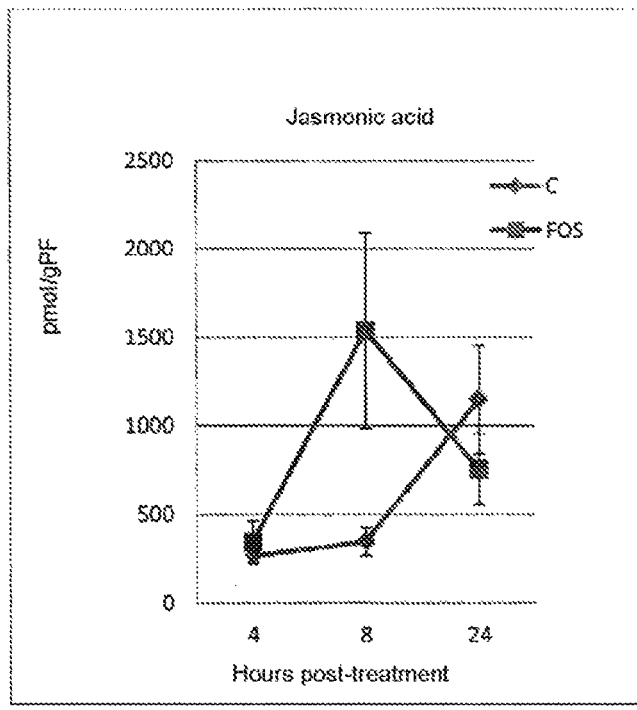
FIG. 2 represents the concentration of jasmonic acid (expressed as pmol/gPF) in the stems of young tobacco plants supplied with a nutritive solution containing a fructooligosaccharide in accordance with the invention (FOS) or the same nutritive solution without FOS (C).
Figure 3:
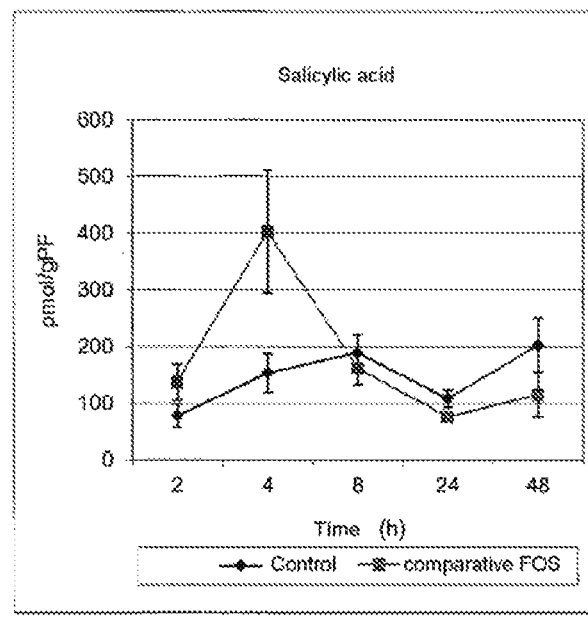
FIG. 3 represents the concentration of salicylic acid (expressed as pmol/gPF) in the stems of plants supplied with a nutritive solution containing a fructooligosaccharide not in accordance with the invention (Comparative FOS) or the same nutritive solution without Comparative FOS (Control).
Figure 4:
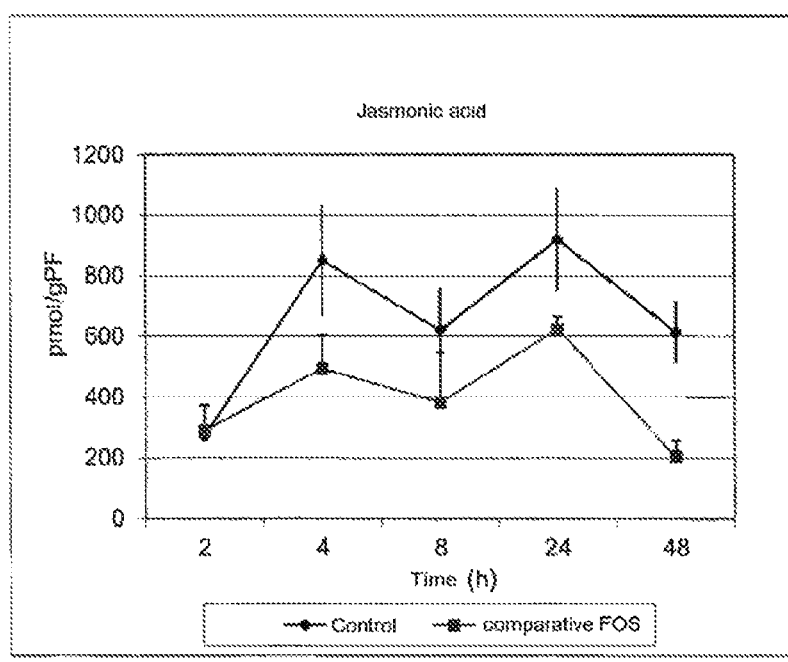
FIG. 4 represents the concentration of jasmonic acid (expressed as pmol/gPF) in the stems of plants supplied with a nutritive solution containing a fructooligosaccharide not in accordance with the invention (Comparative FOS) or the same nutritive solution without Comparative FOS (Control).

The results have been given in FIGS. 1 to 4. It can be seen that the inulin—which comprises more than 10 monosaccharide units—does not induce an increase in the jasmonic add concentration.

On the contrary, a fructooligosaccharide comprising from 2 to 10 monosaccharide units in accordance with the invention induces a plant hormone concentration 4 to 8 times greater, depending on the tissues.

The invention claimed is:

1. A method for stimulating a production of jasmonic acid in a tobacco plant comprising
    applying to said tobacco plant or to a soil in which said tobacco plant is growing, an effective amount of a fructooligosaccharide via a leaf or via a root,
    wherein the fructooligosaccharide consists essentially of fructosylnystose ($GF_4$), nystose ($GF_3$) and kestose ($GF_2$), and
    the combination of fructosylnystose ($GF_4$), nystose ($GF_3$) and kestose ($GF_2$) stimulates the production of jasmonic acid in the tobacco plant.

2. The method according to claim 1, wherein the fructooligosaccharide is applied to the tobacco plant in a liquid form and is used in an amount from 0.1 to 100 g per litre.

3. The method according to claim 1, wherein the fructooligosaccharide is applied to the tobacco plant in a solid form and is used in an amount of from 10 to 1000 g.

4. The method according to claim 3, wherein the fructooligosaccharide is supplied in a pulverulent or a granulated fertilizer.

5. The method according to claim 1, wherein the fructooligosaccharide is sulphated.

6. The method according to claim 1, wherein the fructooligosaccharide is derived from an enzymatic hydrolysis of inulin.

7. The method according to claim 2, wherein the fructooligosaccharide is applied to the tobacco plant in a nutritive solution via a root.

* * * * *